Figure 1:
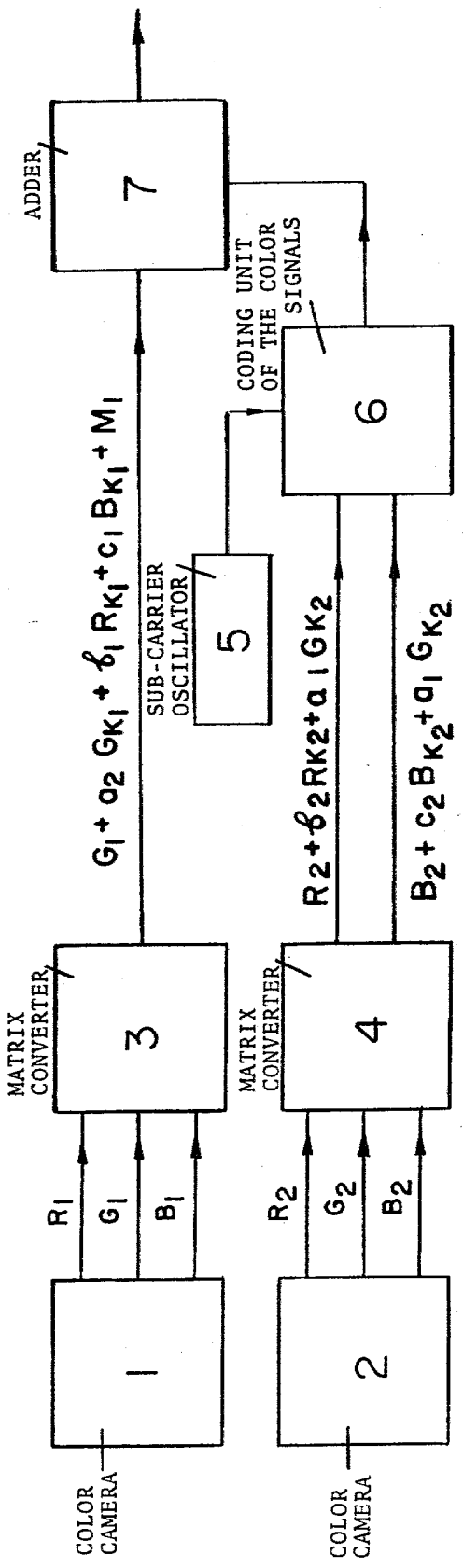

United States Patent [19]

Krasnoperov

[11] 4,236,172
[45] Nov. 25, 1980

[54] STEREOSCOPIC COLOR TELEVISION

[76] Inventor: Boris K. Krasnoperov, Sevastopolsky prospekt, 81, kv. 76, Moscow, U.S.S.R.

[21] Appl. No.: 820,601

[22] Filed: Aug. 1, 1977

[51] Int. Cl.$^2$ .............................................. H04N 9/60
[52] U.S. Cl. ........................................................ 358/3
[58] Field of Search .................... 358/3, 88, 91, 92; 350/132; 352/60, 62; 354/112

[56] References Cited

U.S. PATENT DOCUMENTS 2,777,011  1/1957  Marks ..................................... 358/3

Primary Examiner—John C. Martin
Attorney, Agent, or Firm—Lackenbach, Lilling & Siegel

[57] ABSTRACT

A method of stereoscopic color television, in which six independent signals of color-separated images carrying color information on the green, red and blue components ($G_1$, $R_1$, $B_1$) of a first frame of a stereo pair and carrying color information on the green, red and blue components ($G_2$, $R_2$, $B_2$) of a second frame of a stereo pair are separated at the sending end. The signals of color-separated images carrying color information on the green, red and blue components ($G_1$, $R_1$, $B_1$) of the first frame of the stereo pair are converted, by means of matrixing, into a composite signal consisting of a signal carrying information on the green component ($G_1$), a color signal carrying limited information on the magenta, red and blue colors a selective color signal carrying limited information on the green color. The signals of color-separated images carrying color information on the green, red and blue components ($G_2$, $R_2$, $B_2$) of the second frame of the stereo pair are converted, by means of matrixing, into two signals. One of these signals consists of a signal carrying information on the red component ($R_2$), a color signal carrying limited information on the green color and a color signal carrying limited information on the magenta and red color. The second signal consists of a signal carrying information on the blue component ($B_2$), a selective color signal carrying limited information on the green color and a color signal carrying limited information on the magenta and blue color.

4 Claims, 2 Drawing Figures

STEREOSCOPIC COLOR TELEVISION

The present invention relates to television and, more specifically, to a method of stereoscopic colour television based on the use of the colour anaglyphs technique. The invention can be used in stereoscopic colour television casting, to study ocean depths and surfaces of celestial bodies, and observe processes and phenomena which do not lend themselves to direct observation.

Well known in the art is a method of stereoscopic colour television wherein at the sending end there are generated four signals—one wideband signal containing information on the luminance of the image of the left side frame and three narrow-band signals containing information on the chrominance of the image of the right-side frame. A special multiplexing technique is used for transmission of the four signals through a standard black-and-white television channel. At the receiving end the high-resolution image of the left-side frame is displayed on a monochrome picture tube, while the colour image of reduced resolution of the right-side frame is displayed on a colour picture tube. The screen of the colour picture tube is set at an angle of 90° to the screen of the monochrome picture tube. The images of both screens are superposed by means a semi-transparent diagonal mirror. Placed in front of the monochrome and colour picture tubes are polarizing elements of horizontal and vertical light polarization. The viewers observe the screens through polaroid eyeglasses with horizontal polarization of the light for the left eye and with vertical polarization for the right eye.

This method is disadvantageous in the complexity of the receiving device, low relative aperture, and inconvenience of observation through polaroid eyeglasses, which require that the plane of the eyeglasses and the screen are strictly parallel.

Also known in the art is a method of stereoscopic television based on the binocular mixing principle. This method is based on the ability of man's visual apparatus to percieve a third colour if the eye is acted on separately by two different initial colours, the third colour being the result of additive summation of the two initial colours. This method consists of sending information on the green component ($G_1$) within a complete frequency range provided by a TV standard which is separated from the three-colour components of one frame ($R_1$, $G_1$, $B_1$) by means of a colour separation device. Added thereto is information on the fine elements of the picture from the red and blue components of this frame, i.e. their high-frequency components ($M_1$). Information on the red and blue components ($R_2$, $B_2$) in the form of two independent low-frequency components is separated from the three colour components ($R_2$, $G_2$, $B_2$) of the other frame of the stereo pair. At the receiving end the signal of the first frame of the stereo pair ($G_1+M_1$) is fed to the input for displaying the green colour. In this case the emitter of the green colour is closed at the viewer's side by a polaroid of horizontal light polarization. The signals of the second frame of the stereo pair ($R_2$, $B_2$) are applied respectively to the inputs for displaying the red and blue colours. The emitters of the red and blue luminescence are closed by a polaroid of vertical light polarization. The viewer sees the picture through polaroid eyeglasses admitting the green colour to the left eye and red and blue colours to the right eye.

This method is advantageous in that it is compatible with monochrome television since the wide-band signal ($G_1+M_1$) can serve as a luminance signal for black-and-white television, while the narrow-band signals ($R_2$, $B_2$) can be transmitted on the subcarrier in the signal spectrum ($G_1+M_1$) in the same way as chrominance signals are transmitted in the colour television systems. With white, yellow and blue colours binocular mixing can be effected.

However, this method is disadvantageous in that with green, magenta, red and blue colours one eye of the viewer sees the light from the image of the corresponding frame of the stereo pair, while the other eye sees nothing and this results in loss of stereoscopic vision and in colour distortion. Furthermore, the polaroid eyeglasses must be strictly parallel to the planes of the polaroid films on the emitters and this constrains the viewer and limits his mobility.

Also known in the art is a method of stereoscopic colour television based on the use of a colour anaglyphs method (cf. British Patent Specification No. 899,969, cl. H04 n, 1960), wherein at the sending end there are separated three independent signals of colour-separated images carrying information on the green component with high-frequency components of the red and blue components of the first frame of the stereo pair and also on the red and blue components with high-frequency components of the green components of the second frame of the stereo pair, their transmission through individual communication channels, reception of these signals, display of the green, red and blue colours, respectively, and generation of a picture by means of separation of the green component for one eye of a viewer and the blue component for the other eye of the viewer.

This method provides for transmission of high-frequency components of the colour components of both frames of the stereo pair. This somewhat improves the stereoscopic quality of the picture which is displayed on a conventional three-colour display device used in colour television and is observed through colour separating eyeglasses—light filters (colour anaglyphs).

This method is advantageous in simplicity of the display device in the receiver, and convenient conditions of viewing the television picture without limiting the viewer mobility.

The disadvantage of this method is that, like in the preceding method, the stereoscopicity of the large details of the picture is lost together with colour distortion when transmitting images of objects having green, magenta red and blue colours, which are perceived by the viewer through a single colour light filter, i.e. by one eye when the conditions for binocular vision are no longer present. This method is featured by only partial application of the binocular mixing. Compared to the known black-and-white stereoscopic television based on the use of the method of colour anaglyphs in which binocular mixing of green and magenta colours is effected, in this method the binocular mixing is spread to two other colours; yellow and cyan. The yellow colour is obtained by mixing green and red colours, the cyan colour is obtained by mixing green and blue colours. No binocular mixing is provided with green, magenta, red, and blue colours. As a result distortion of colours takes place, the nature of which depends on many factors: the luminance of the colour objects; dimensions of the colour details of the picture, i.e. on the viewing angle; the background of these details; saturation of the colour tones; the spectral composition of the phosphors and the characteristics of the colour light filters; and subjective factors associated with the peculiarities of the visual apparatus of the viewer. The distortion of the picture, as it is seen by the viewer, manifests itself in that the details of the image of the above colours are either much darker than the natural colours (up to black) or much brighter and more saturated than the natural colours.

In this method for four colour bars of six (taking no account of the white one) there is no conditions for binocular mixing, due to which the efficiency of this method is low.

Thus, this method features low efficiency, colour distortion and deterioration of the picture quality.

Furthermore, the presence of a mixture of high-frequency components in the signals of both frames of the stereo pair occupying a double width of the frequency range eliminates a possibility of their transmission through a standard black-and-white television channel.

An object of the present invention is to eliminate the above-mentioned disadvantages.

Another object of the invention is to develop a method of stereoscopic colour television compatible with black and white television.

Still another object is to increase the quality of stereoscopic television.

These objects are attained by providing a method of stereoscopic colour television which includes the steps of separating at a sending end, of three independent signals of colour-separated images carrying colour information on the green component ($G_1$) of the first frame of the stereo pair and on the red component ($R_2$) and the blue component ($B_2$) of the second frame of the stereo pair; transmitting these signals through individual communication channels; receiving these signals; displaying the green, red and blue colours respectively; producing a picture by means of separation of the green component for one eye of the viewer and of the red and blue components for the other eye of the viewer. According to the invention, at the sending end, additional separation is made of the signals of the colour-separated images carrying colour information on the red and blue components ($R_1$, $B_1$) of the first frame of the stereo pair and the colour information on the green component ($G_2$) of the second frame of the stereo pair while the signals of colour-separated images carrying information on the green, red and blue components ($G_1$, $R_1$, $B_1$) of the first frame of the stereo pair are converted, by matrixing, into a composite signal consisting of a signal carrying information on the green component ($G_1$), a colour signal carrying limited information on the magenta, red and blue signals whose value is selected so as to provide a stereoscopic image of the objects of these colours, and a colour signal carrying limited information on the green colour whose value is selected so as to provide correct display of the saturated green colour, while the signals of the colour-separated images carrying information on the green, red and blue components ($G_2$, $R_2$, $B_2$) of the second frame of the stereo pair is converted, by means of matrixing, into two signals, one of which consists of a signal carrying information on the red component ($R_2$), a colour signal carrying limited information on the green colour whose value is determined from the condition of providing a stereoscopic image of the objects of this colour and a colour signal carrying limited information on the magenta and red colours whose value is selected so as to provide correct reproduction of the saturation of these colours, whereas the second signal consists of a signal carrying information on the blue component ($B_2$), a selective colour signal carrying limited information on the green colour whose value is selected so as to provide a stereoscopic image of the objects of this colour and a colour signal carrying limited information on the magenta and blue colours whose value is selected so as to provide correct reproduction of the saturation of these colours.

It is expedient that in the optimal embodiment of the invention the colour signal carrying limited information on the magenta, red and blue colours of the composite signal obtained due to matrixing the signals of the colour-separated images carrying information on the green, red and blue components ($G_1$, $R_1$, $B_1$) of the first frame of the stereo pair consists of a separate colour signal carrying limited information on the magenta and red colour and a separate colour signal carrying limited information on the magenta and blue colours.

It is also expedient that in the optimal embodiment of the invention the composite signal, which is obtained due to conversion of the signals of the colour-separated images carrying information on the green, red and blue components ($G_1$, $R_1$, $B_1$) of the first frame of the stereo pair is written as $$G_1 + b_1 Rk_1 + c_1 Bk_1 + a_2 Gk_1 + M_1 \quad [1]$$

where $G_1$ is the signal carrying information on green component whose frequency is limited by the upper accepted for colour reproduction;

$Rk_1 = R_1 - G_1 \geq 0$ [2] is the separate colour signal carrying limited information on the magenta and red colours, which is a colour-difference signal whose polarity is limited by the domain of positive values and whose frequency is limited by the same range as $G_1$;

$Bk_1 = B_1 - G_1 \geq 0$ [3] is the separate colour signal carrying limited information on the magenta and blue colour and constituting a colour-difference signal restricted in polarity by the domain of positive values and in frequency by the same range as $G_1$;

$Gk_1 = G_1 - R_1 - B_1' \geq 0$ [4] is the colour signal carrying limited information on the green colour and constituting a three-component colour-difference signal whose polarity is restricted by the domain of positive values and whose frequency is restricted by the same range as $G_1$, where $-B_1' = R_1 - B_1 \geq 0$ [5] is the colour-difference signal whose polarity is restricted by the domain of negative values;

$M_1 = 0.6\ G_1 + 0.3\ R_1 + 0.1\ B_1$ [6] are the high-frequency components of the primary signals of the first frame; the signals, which are obtained by means of conversion of the signals of the colour-separated images carrying information on the green, red and blue components ($G_2$, $R_2$, $B_2$) of the second frame of the stereo pair are limited in frequency by the upper range accepted for colour reproduction and are written as $$R_2 + a_1 G_{k2} + b_2 R_{k2} \quad [7] \text{ and } B_2 + a_1 G_{k2} + c_2 B_{k2} \quad [8]$$

where $R_2$ is the signal carrying information on the red component;

$B_2$ is the signal carrying information on the blue component;

$G_{k2} = G_2 - B_2 - R_2' \geq 0$ [9] is the colour signal carrying limited information on the green colour and serving as a three-component colour-difference signal whose polarity is limited by the domain of positive values, where $R_2' = B_2 - R_2$ [10] is the colour-difference signal whose polarity is limited by the domain of negative values;

$R_{k2} = R_2 - G_2 \geq 0$ [11] is the colour signal carrying limited information on the magenta and red colours and constituting a colour-difference signal whose polarity is limited by the domain of positive values;

$B_{k2} = B_2 - G_2 \geq 0$ [12] is the colour signal carrying limited information on the magenta and blue colours; in this case the coefficients $a_1$, $b_1$, $c_1$ are selected to provide stereoscopicity and to eliminate colour distortions with green, magenta, red, and blue saturated colours, while the coefficients $a_2$, $b_2$, $c_2$ are selected to compensate the drop in the saturation of the green, magenta, red, and blue colour tones.

It is reasonable that the colour signal carrying limited information on the magenta, red and blue colours of the composite signal obtained by matrixing the signals of colour-separated images carrying information on the green, red and blue components ($G_1$, $R_1$, $B_1$) of the first frame of the stereo pair consists of a separate signal carrying information on the magenta, a separate signal carrying information on the red colour and a separate signal carrying information on the blue colour, whereas the colour signal carrying limited information on the magenta and red colour of the first signal obtained by matrixing the signals of colour-separated images carrying information on the green, red and blue components ($G_2$, $R_2$, $B_2$) of the second frame of the stereo pair consists of a separate signal carrying information on the magenta and a separate signal carrying information on the red colour, while the signal carrying limited information on the magenta and blue colour of the second signal obtained by matrixing the signals of colour-separated images carrying information on the green, red and blue components ($G_2$, $R_2$, $B_2$) of the second frame of the stereo pair consists of a separate signal carrying information on the magenta and a separate signal carrying information on the blue colour.

Figure 2:
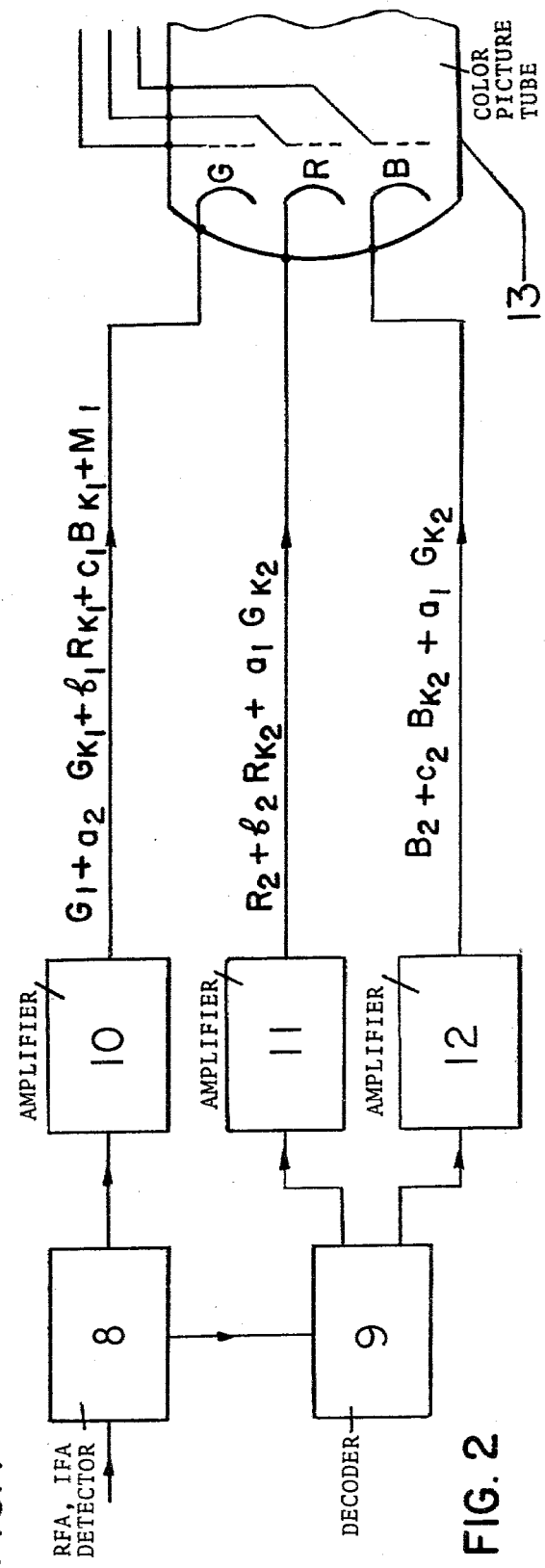

The present invention is further described with reference to some specific embodiments thereof. This specification is to be taken with the accompanying drawings in which:

FIG. 1 shows a transmitting device of a stereo color television in accordance with the present invention; and FIG. 2 illustrates a receiving device of a stereo color television which embodies and incorporates the features of the present invention.

The proposed method is based on the use of the method of colour anaglyphs. The sending station is equipped with a colour television camera as a transmitter of signals ($R_1$, $G_1$, $B_1$) of the left-side frame of a stereo pair (first frame) and a camera serving as a transmitter of signals ($R_2$, $G_2$, $B_2$) of the second frame of the stereo pair (second frame). In these colour television cameras the green, red and blue colour components ($G_1$, $R_1$, $B_1$) are separated for shaping a signal of the left-side frame of the stereo pair as well as the green, red and blue components ($G_2$, $R_2$, $B_2$) for shaping two signals of the right-hand frame of the stereo pair.

The signals of the colour-separated images carrying colour information, on the green, red and blue components ($G_1$, $R_1$, $B_1$) of the left-side frame of the stereo pair is converted, by means of matrixing in a matrix converter, into a composite signal of the left-side frame of the stereo pair, which includes several components. The first component is presented by the signal carrying information on the green colour component ($G_1$), i.e. the information on the white, yellow, cyan, and green colours. The second component is a colour signal carrying information only on the magenta, red and blue colours when the signal $G_1$ is zero. The magnitude of this signal is selected so as to provide a stereoscopic image of the ojects of the magenta, red and blue colours. The third component is a colour signal carrying information on the green colour, the magnitude of which is specified by the condition of correct reproduction of the saturation of this colour. The abovementioned colour signals are limited by the upper range of the frequency band accepted for reproduction of colours (e.g. from 0 to 1.5 MHz). The fourth component includes high-frequency components (a mixture of high frequencies $M_1$) of the primary signals ($R_1$, $G_1$, $B_1$) of the left-side frame from 1.5 to 6.0 MHz obtained by passing the luminance $Y_1 = 0.66 + +0.3R_1 + 0.1B_1$ (13) of the left-side frame of the stereo pair through a high-pass filter.

The obtained composite wide-band signal of the left-side frame carrying information on the white, yellow, cyan, green, magenta, red, and blue colours is transmitted through the communication channel similar to the transmission of the luminance signal in colour television systems and at the receiving end is applied to the input for reproducing the green colour component.

The signals of the colour-separated images carrying colour information on the green, red and blue components ($G_2$, $R_2$, $B_2$) of the right-hand frame of the stereo pair are converted, by means of matrixing in a matrix converter, into two narrow-band signals (from 0 to 1.5 MHz), each consisting of several components.

The first signal of the right-side frame of the stereo pair consists of the following components.

1. A signal carrying information on the red colour component ($R_2$), i.e. on the white, yellow, magenta, and red colours.

2. A colour signal carrying information only on the green colour, in which $R_2$ is absent (equal to zero). The magnitude of this signal is specified by the condition of providing a stereoscopic image of the objects of a green colour.

3. A colour signal carrying information only on the magenta and red colour. The magnitude of this signal is specified by the condition of correct reproduction of the saturation of the magenta and red colour.

The obtained low-band signal carrying information on the white, yellow, green, magenta and red colours is transmitted through a communication channel similarly to a chrominance signal R-Y in colour television systems. At the receiving side this signal is fed to the input for reproducing the red colour component.

The other signal of the right-hand frame of the stereo pair consists of the following components.

1. A signal carrying information on the blue colour component ($B_2$), i.e. on the white, cyan, magenta, and blue colours.

2. A selective colour signal carrying information only on the green colour, which $B_2$ is absent (equal to zero). The magnitude of this signal is selected so as to provide a stereoscopic image of the object of a green colour.

3. A selective colour signal carrying information only on the magenta and blue colour. The magnitude of this signal is selected so as to provide correct reproduction of the saturation of the magenta and blue colours.

The obtained narrow-band signal carrying information the white, cyan, green, magenta, and blue colours is transmitted through a communication channel similarly to a chrominance signal B-Y in colour television systems at the receiving end this signal is fed to the input for reproducing the blue colour component.

In a preferable embodiment of the invention the signals of the left-side and right-side frames are shaped so that the colour signal carrying limited information on the magenta, red and blue colours of the composite signal obtained due to matrixing of the signals of colour-separated images carrying information on the green, red and blue components ($G_1$, $R_1$, $B_1$) of the left-hand frame of the stereo pair, said colour signal consisting of two components. These include a separate colour signal carrying limited information on the magenta and red colour and separate colour signal carrying limited information on the magenta and blue colour.

In this case the signals of colour-separated images of the left-side frame ($R_1$, $G_1$, $B_1$) is converted, by means of matrixing in a matrix converter, into a composite signal having the following form:

$$G_1 + b_1 R_{k1} + c_1 B_{k1} + a_2 G_{k1} + M_1 \qquad [1]$$

where $G_1$ is the signal carrying information on the green colour component whose frequency is limited by the upper range accepted for colour reproduction (up to 1.5 MHz);

$R_{k1}$ is the separate colour signal carrying limited information on the magenta and red colour. With white, yellow, cyan, green, and blue colours it is equal to zero. It is obtained by limiting the colour-difference signal $(R_1-G_1)$ [2] in polarity by the domain of positive values and in frequency by the same range as the signal $G_1$;

$B_{k1}$ is a separate colour signal carrying limited information on the magenta and blue colour. With white, yellow, cyan, green, and red colours it is equal to zero. It is obtained by limiting the colour-difference signal $(B_1-G_1)$ [13] in polarity by the domain of positive values and in frequency - by the same range as the signal $G_1$;

$G_{k1}$ is the selective colour signal carrying limited information on the green colour. It is equal to zero with white, yellow, cyan, magenta, red, and blue colours. It is obtained by limiting the three-component colour-difference signal $(G_1-R_1-B_1')$ [14] in polarity by the domain of positive values and in frequency by the same range as the signal $G_1$.

In this case $-B_1' = R_1 - B_1 \leq 0$ [5] is the colour-difference signal whose polarity is limited by the domain of negative values.

An equivalent value of the signal $G_{k1}$ can be obtained by limiting the three-component colour-difference signal $(G_1-B_1-R_1')$ [14] in polarity by the domain of positive values and in frequency by the same range as the signal $G_1$, where $-R_1' = B_1 - R_1 \leq 0$ [15] the colour-difference signal whose polarity is limited by the domain of negative values. In this case the signal $G_{k1}$ is written as follows $$G_{k1} = G_1 - B_1 - R_1' \geq 0 \qquad [14]$$

$M_1$ are high-frequency components of the primary signals ($R_1$, $G_1$, $B_1$) of the left-side pair of the stereo pair obtained by passing the wide-band luminance signal $Y = 0.6\ G_1 + 0.3\ R_1 + 0.1\ B_1$ [13] (from 0 to 6.0 MHz) through a high-pass filter (from 1.5 MHz to 6.0 MHz).

The signals of colour-separated images of the right-side frame of the stereo pair ($R_2$, $G_2$, $B_2$) are converted by a matrix converter into two narrow-band (from 0 to 1.5 MHz) signals of the following form:

$$R_2 + a_1 G_{k2} + b_2 R_{k2} \qquad [7]$$

$$B_2 + a_1 G_{k2} + c_2 B_{k2} \qquad [8]$$

where $R_2$ is the signal carrying information on the red colour component;

$B_2$ is the signal carrying information on the blue colour component;

$G_{k2}$ is the colour signal carrying limited information on the green colour. It is equal to zero for white, yellow, cyan, magenta, red and blue colours. It is obtained by limiting the polarity of the three-component of the colour-difference signal $(G_2-B_2-R_2')$ [9] by the domain of positive values. In this case $-R_2' = B_2 - R_2 \leq 0$ [10] is the colour-difference signal whose polarity is limited by the domain of negative values.

An equivalent value of the signal $G_{k2}$ can be obtained by limiting the polarity of the colour-difference signal $(G_2-R_2 B_2')$ [16] by the domain of positive values. In this case $-B_2' = R_2 - B_2 \leq 0$ [17] is the colour-difference signal whose polarity is limited by the domain of negative values, while the signal $G_{k2}$ has the form:

$$G_{k2} = G_2 - R_2 - B_2' \geq 0 \qquad [16]$$

Then, $R_{k2}$ is the colour signal carrying limited information on the magenta and red colour. It is equal to zero for white, yellow, cyan, green, and blue colours. It is obtained by limiting the polarity of the colour-difference signal $(R_2-G_2)$ [11] by the domain of positive values.

$B_{k2}$ is the colour signal carrying limited information on the magenta and blue colours. It is equal to zero for white, yellow, cyan, green, and blue colours. It is obtained by limiting the polarity of the colour-difference signal $(B_2-G_2)$ [12] by the domain of positive values.

The values of the coefficients $a_1$ V(in the signal $a_1$ $Gk_2$, of the right-side frame,) $b_1$ Y (in the signal $b_1 Rk_1$ of the left-side frame) and $c_1$ (in the signal $c_1 Bk_1$ of the left-side frame) are found experimentally by means of selection to as to provide a stereoscopic image of the objects of green, magenta, red, and blue colours when displaying real pictures.

The values of the coefficients $a_2$ (in the signal $a_2 Gk_1$ of the left-side frame), $b_2$ (in the signal $b_2 Rk_2$ of the right-side frame) and $c_2$ (in the signal $c_2 Bk_2$ of the right-side frame) are also found experimentally by means of selection so as to provide correct reproduction of the saturation of the green, magenta, red, and blue colour tones in really transmitted pictures.

Thus, the entire information on the stereoscopic colour picture is contained in three signals:

$$G_1 + b_1 R_{k1} + c_1 B_{k1} + a_2 G_{k1} + M_1 \qquad [1]$$

(left-side frame)

$$R_2 + a_1 G_{k2} + b_2 R_{k2} \qquad [7];$$
and $$B_2 + a_1 G_{k2} + c_2 B_{k2} \qquad [8]$$

(right-side frame)

The three shaped signals: one wide-band signal of the left-side frame of the stereo pair and two narrow-band signals of the right-side frame of the stereo pair are transmitted through a communication channel similar to transmission of the signals in colour television systems. In this case the wide-band signal is transmitted through the luminance channel while the two narrow-band signals are transmitted through the chrominance channel. This provides compatibility of stereoscopic television with existing black-and-white television.

It is known that if one frame of a stereo pair has lower resolution than the other frame, the received stereoscopic picture has resolution close to that of the frame reproduced by means of the wide-band signal. Furthermore, it is possible to improve the resolution of the image boundaries of the frame with lower resolution by means of a corrector which restores the fronts.

In the receiver the signal of the left-side frame $(G_1+b_1R_{k1}+c_1B_{k1}+a_2G_{k1}+M_1)$ [1] is applied to the input for reproducing the green component, while the signals of the right-side frame $(R_2+a_1 G_{k2}+b_2R_{k2})$ [7] and $(B_2+a_1 G_{k2}+c_2B_{k2})$ [8] are applied respectively to the inputs for reproducing the red and blue colour components.

The picture is observed through eyeglasses (light filters) which pass green light to the eye observing the left-side frame and pass red and blue light to the eye observing the right-side frame.

The wide-band signal of the left-side frame $(G_1+b_1R_{k1}+c_1B_{k1}+a_2G_{k1}+M_1)$ [1] and the two narrow-band signals of the right-side frame $(R_2+a_1 G_{k2}+b_2R_{k2})$ [7] and $(B_2++a_1 G_{k1}+c_2B_{k2})$ [8] can be changed so that the primary signals of the right-side frame $(R_2, G_2, B_2)$ are converted into a composite wide-band signal and is fed to the receiver input for reproducing the green component observed by the right eye through a green light filter, while the primary signals of the left-side frame $(R_1, G_1, B_1)$ are converted into two narrow-band signals fed to the receiver input for reproducing, respectively, the red and blue components observed by the left eye through a magenta light filter.

The three-colour display, which in principle does not differ from display devices of modern colour television systems (three-colour picture tubes, projection kinescopes, light-valve and laser devices) is suitable for wide-use stereoscopic colour television systems.

In this case the higher the quality of a stereoscopic colour picture, the more distinctive are the boundaries of the spectra of radiation of the red, green and blue phosphors. Clear distinction of the spectra provides good separation of the images of the frames of the stereo pair.

Furthermore, improvement of the quality of the picture can be obtained due to accurate adjustment of colour kinescopes so that the electron beam used for excitation of one phosphors does not strike another phosphor.

The reproduction of a high-quality stereoscopic colour television picture is effected as follows.

During the transmission of white, yellow, and cyan colours when both eyes of the viewer receive the corresponding colour information, the stereoscopic picture is displayed in the same manner as in the case of stereoscopic black-and-white television based on the method of colour anaglyphs. The viewer sees three-dimensional white objects due to the effect of binocular mixing of the green colour from the left-side frame. Three-dimensional yellow objects are seen when mixing the green colour from the left-side frame and the red colour from the right-side frame. Three-dimensional cyan objects are seen when mixing the green colour from the left-side frame and the blue colour from the right-side frame.

With above-said binocular colours, the information in the form of a signal $(G_1+M_1)$ applied to the input for the reproduction of the green colour component and signals $(R_2)$ and $(B_2)$ applied to the input for reproducing the red and blue colour components, respectively, is necessary and sufficient for obtaining a high-quality stereoscopic picture.

In this case the signals $G_{k1}$, $G_{k2}$, $R_{k1}$, $R_{k2}$, $B_{k1}$, and $B_{k2}$ are not present.

When transmitting images of the green objects, the left-side frame signal $(G_1+M_1)$ is applied to the input for reproducing the green colour component simultaneously with the right-side frame signal $(a_1 G_{k2})$ applied to the input for reproducing the red and blue colour components. This causes some magenta phosphorescence proportional to the green colour saturation, which is necessary for obtaining a stereoscopic picture. Alongside with provision of stereoscopicity, the signal $(a_1 G_{k2})$ eliminates green colour distortion. The green colour distortion without the signal $(a_1 G_{k2})$ manifests itself in that the green colour is either darker or lighter than the original one. In both cases the magenta phosphorescence caused by the signal $(a_1 G_{k2})$ and summed up with the green phosphorescence in the viewer's brain produces a certain white component which shifts the dark-green or light-green colour towards green. This results from the fact that addition of white to dark-green increases the brightness of the green colour, while addition of the same to bright-green causes saturation of the latter.

However, in some cases the level of the signal $(a_1 G_{k2})$ selected so to obtain a stereoscopic picture can be higher than it is necessary for elimination of the colour distortion. In this case the white component will be excessive and will reduce the saturation of the green colour. This drop in the green colour saturation is compensated by the signal $(a_2 G_{k1})$ which, having been added to the signal $(G_1)$, increases the brightness of the green phosphorescence and, therefore, the green colour saturation. Thus, a possible increase in the brightness of the picture of the green objects will not be perceived as deterioration of this picture.

On transmitting the magenta, the left-side frame signal $(b_1R_{k1}+c_1B_{k1})$ applied to the input for reproducing the green colour component acts simultaneously with the right-side frame signals $(R_2)$ and $(B_2)$ applied to the input for reproducing the red and blue colour components respectively. Consequently, green phosphorescence appears, which is proportional to the magenta saturation required for obtaining a three-dimensional picture. At the same time, this signal eliminates distortion of the magenta tone. When the level of the signal $(b_1R_{k1}+c_1B_{k1})$ is greater than it is necessary for elimination of the magenta distortion and reduces the saturation of this colour, the signals $(b_2 R_{k2})$ and $(c_2B_{k2})$ come into action. When added to the signals $(R_2)$ and $(B_2)$, they increase the brightness of the magenta phosphorescence and, therefore, the magenta saturation.

On transmitting the red colour, the left-side frame signal $(b_1 R_{k1})$ applied to the input for reproducing the green colour component acts simultaneously with the right-side frame signal $(R_2)$ applied to the input for reproducing the red colour component. This results in appearance of green phosphorescence proportional to the red colour saturation, which is necessary for producing a three-dimensional picture. A possible drop in the red colour saturation (yellowish tone) is compensated by the signals $(b_2R_{k2})$ which, when added to the signal $(R_2)$ increases the brightness of red colour.

On transmitting the blue colour, the left-side frame signal $(c_1 B_{k1})$ appled to the input for reproducing the green colour component acts simultaneously with the right-side frame signal (B₂) applied to the input for reproducing the blue colour component. This results in green phosphorescence proportional to the blue colour saturation required for producing a three-dimensional picture. Possible drop of the saturation of the blue colour (its cyan tone) is compensated by the signal ($c_2B_{k2}$) which, when added to the signal (B₂), increases the brightness of the blue colour.

Thus, the conditions required for the action of binocular mixing are observed for all colours so that the proposed method provides a high-quality stereoscopic colour picture.

The load on the eyes can be balanced by regularly interchanging the light filters, for example, by using the green light filter for the left eye on even days and for the right eye on odd days. The eyeglasses can be constructed so that the filters are easily interchanged.

Some other results can be obtained using other variations.

In these versions the colour signals carrying limited information on the magenta, red and blue colours of a composite signal are obtained by matrixing the signals of the colour-separated images carrying information on the green, red and blue components ($G_1$, $R_1$, $B_1$) of the left-side frame of the stereo pair consists of three components. These include a separate signal carrying information on the magenta a separate signal carrying information on the red colour and a separate signal carrying information on the blue colour.

The signal carrying information on the magenta and red colour of the first signal obtained by matrixing the signals of colour-separated images carrying information on the green, red and blue components ($G_2$, $R_2$, $B_2$) of the right-side frame of the stereo pair consists of two components. These include a separate signal carrying information on the magenta and a separate signal carrying information on the red colour.

The colour signal carrying limited information on the magenta and blue colour of the second signal, which is obtained by matrixing the signals of colour-separated images carrying information on the green, red and blue components ($G_2$, $R_2$, $B_2$) of the right-side frame of the stereo pair consists of two components. These include a separate signal carrying information on the magenta and a separate signal carrying information on the blue colour.

The separate signal carrying information only on the magenta has a form $$\prod_k = \frac{R + B - R' - B'}{2} - G \geq 0, \quad [18]$$

where $R' = R - B \geq 0 [19]$; $-B' = R - B \leq 0$ [20] or $-R' = B - R \leq 0$ [21]; $B' = B - R > 0$ The separate signal carrying information only on the red colour has a form $R_k^0 = R - G - B' \geq 0$ [23] where $-B' = G - B \leq 0$ [24] or $R_k^0 = R - B - G' \geq 0$ [25] where $-G' = B - G \leq 0$ [26].

The separate signal carrying information only on the blue colour has a form:

$B_k^0 = B - G - R' \geq 0$ [27], where $-R' = G - R \leq 0$ [28]
or $B_k^0 = B - R - G' \geq 0$ [28], where $-G' = R - G \leq 0$ [30]

With the above-mentioned separated signals carrying information only on the magenta, red colour and blue colour, the composite signal of the first frame has the following form $$G_1 + d_1 \prod k_1 + b_1 R_{k1}{}^0 + c_1 B_{k1}{}^0 + a_2 G_{k1} + M_1, \quad [31]$$

while the signals of the second frame have a form:

$$R_2 + a_1 G_{k2} + d_2 \prod k_2 + b_2 R_{k2}{}^0 \quad [32]$$

$$\text{and } B_2 + a_1 G_{k2} + d_2 \prod k_2 + c_2 B_{k2}{}^0 \quad [33]$$

Different versions can be provided depending on the selection of the other pairs of complementory colours accepted in manufacture of colour separation filters. Instead of the magenta colour separation filter used in the preferable embodiment of the invention, cyan, red or yellow and blue colour separation filters can be employed for shaping respective signals of the left-side and right-side frames of a stereo pair.

With the blue and red colour separation filters the two signals of the left-side frame have the following form:

$$G_1 + b_1 R_{k1} + a_2 G_{k1} + M_1 \quad [34]$$
(wide-band) and
$$B_1 + b_1 R_{k1} + c_2 B_{k1} \quad [35]$$
(narrow-band),
where $R_{k1} = R_1 - G_1 - B_1' > 0$ [36], where $= B_1' = G_1 - B_1 \leq 0$ [37] or $R_{k1} = R_1 - B_1 - G_1' \leq 0$ [38], where $-G_1' = B_1 - G_1 \leq 0$ [39] $G_{k1} = G_1 - R_1 \geq 0$ [40]; $B_{k1} = B_1 - R_1 \geq 0$ [41]

The right-side frame signal has a form:

$$R_2 + a_1 G_{k2} + c_1 B_{k2} + b_2 R_{k2} \quad [42]$$
(narrow-band),
where $G_{k2} = G_2 - R_2 \geq 0$ [43]; $B_{k2} = B_2 - R_2 \geq 0$ [44]; $R_{k2} = R_2 - G_2 - B_2' \geq 0$ [45]; $-B_2' = G_2 - B_2 \leq 0$ [46] or $R_{k2} = R_2 - B_2 - G_2' \geq 0$ [47]; $-G_2' = B_2 - G_2 \leq 0$ [48]

With the yellow and blue colour separation filters the two signals of the left-side frame have the following form:

$$G_1 + c_1 B_{k1} + a_2 G_{k1} + M \quad [49]$$
(wide-band) and
$$R_1 + c_1 B_{k1} + b_2 R_{k1} \quad [50]$$
(narrow-band),
where $B_{k1} = B_1 - G - R_1' \geq 0$ [51]; $-R_1' - G_1 - R_1 \leq 0$ [52]
or $B_{k1} = B_1 - R_1 - G_1' \geq 0$ [53], where $-G_1' = R_1 - G_1 \leq 0$ [54] $G_{k1} = G_1 - B_1 \geq 0$ [55]; $R_{k1} = R_1 - B_1 \geq 0$ [56]

The right-side frame signal has a form $$B_2 + a_1 G_{k2} + b_1 R_{k2} + c_2 B_{k2} \quad [57]$$
(narrow-band),
where $G_{k2} = G_2 - B_2 \geq 0$ [58]; $R_{k2} = R_2 - B_2 \geq 0$ [59]; $B_{k2} = B_2 - G_2 - R_2' \geq 0$ [60] $-R_2' = G_2 - R_2 \leq 0$ [61]; or $B_{k2} = B_2 - R_2 - G_2' \geq 0$ [62]; $-G_2' = R_2 - G_2 \leq 0$ [63].

In this case the coefficients $a_1$, $b_1$, $c_1$ are selected to provide a three-dimensional picture, while the coefficients $a_2$, $b_2$, $c_2$ are selected to provide correct reproduction of the saturation of the respective monocular colours.

FIGS. 1 and 2 illustrate, by way of example only, one embodiment by which the method of the present invention can be practiced. Thus, FIG. 1 shows a possible transmitting device which includes color cameras 1 and 2, matrix converters 3 and 4, a sub-carrier oscillator 5, a coding unit of the color signals 6 and an adder 7. In FIG. 2, a possible receiving device is shown which includes an RFA, IFA detector 8, a decoder 9, amplifiers 10-12 and a color picture tube 13. FIGS. 1 and 2 illustrate typical functional blocks which can be used to generate the signals shown in the figures and described in connection with the method of the present invention.

What is claimed is:

1. A method of stereoscopic colour television including the steps of separating, at the sending end, independent signals of colour-separated images carrying colour information on the green, red and blue components ($G_1$, $R_1$, $B_1$) of a first frame of the stereo pair and carrying colour information on the green, red and blue components ($G_2$, $R_2$, $B_2$) of the second frame of the stereo pair;

conversion, by means of matrixing, of said signals of colour-separated images carrying colour information on the green, red and blue components ($G_1$, $R_1$, $B_1$) of the first frame of the stereo pair into a composite signal consisting of a first colour signal carrying information on the green component ($G_1$), a second colour signal carrying limited information on the magenta, red and blue colours whose value is selected so as to provide stereoscopic pictures having these colours, and a third colour signal carrying limited information on the green colour whose value is selected so as to provide correct reproduction of the saturation of the green colour;

conversion, by means of matrixing, of said signals of colour-separated images carrying colour information on the green, red and blue components ($G_2$, $R_2$, $B_2$) of the second frame of the stereo pair into two signals, one of which consists of a signal carrying information on the red component ($R_2$), of the colour signal carrying limited information on the green colour whose value is selected so as to provide a stereoscopic picture of the objects of this colour, and a colour signal carrying limited information on the magenta and red colour whose value is selected so as to provide correct reproduction of the saturation of these colours, while the second signal consists of a signal carrying information on the blue component ($B_2$), of the colour signal carrying limited information on the green colour whose value is selected so as to provide a stereoscopic picture of the objects having this colour, and a colour signal carrying limited information on the magenta and blue colour whose value is selected so as to provide correct reproduction of the saturation of these colours;

transmission of said signals of the first frame of the stereo pair and the signals of the second frame of the stereo pair, obtained due to matrixing, through individual communication channels;

reception of said signals of the first frame of the stereo pair and said signals of the second frame of the stereo pair;

reproduction of the green, red and blue colours respectively;

production of a television picture by separating the green component for one eye of the viewer and by separating the red and blue components for the other eye of the viewer.

2. A method of stereoscopic colour television according to claim 1, in which the colour signal carrying limited information on the magenta, red and blue colours of the composite signal obtained due to matrixing of the signals of the colour-separated images carrying information on the green, red and blue components ($G_1$, $R_1$, $B_1$) of the first frame of the stereo pair consists of a separate signal carrying information on the magenta, a separate signal carrying information on the red colour and a separate signal carrying information on the blue colour, while the colour signal carrying limited information on the magenta and red colour of the first signal obtained due to matrixing the signals of colour-separated images carrying information on the green, red and blue components ($G_2$, $R_2$, $B_2$) of the second frame of the stereo pair consists of a separate signal carrying information on the magenta and a separate signal carrying information on the red colour, while the colour signal carrying limited information on the magenta and blue colour of the second signal obtained due to matrixing the signals of colour-separated images carrying information on the green, red and blue components ($G_2$, $R_2$, $B_2$) of the second frame of the stereo pair consists of a separate signal carrying information on the magenta and a separate signal carrying information on the blue colour.

3. A method of stereoscopic colour television, which includes the steps of separation of six independent signals of colour-separated images carrying information on the green, red and blue components ($G_1$, $R_1$, $B_1$) of the first frame of the stereo, pair and colour information on the green, red and blue components ($G_2$, $R_2$, $B_2$) of the second frame of the stereo pair at the sending end;

conversion, by means of matrixing, of said signals of colour-separated images carrying information on the green, red and blue components ($G_1$, $R_1$, $B_1$) of the first frame of the stereo pair into a composite signal consisting of a signal carrying information on the green component ($G_1$), of a colour signal carrying limited information on the magenta, red and blue colours consisting of a separate colour signal carrying limited information on the magenta and blue colour and of a separate colour signal carrying limited information on the magenta and blue colour and having a value selected so as to provide a stereoscopic picture of the objects of these colours, and of a colour signal carrying limited information on the green colour and having a value selected so as to provide correct reproduction of the green colour saturation;

conversion, by means of matrixing, of said signals of colour-separated images carrying information on the green, red and blue components ($G_2$, $R_2$, $B_2$) of the second frame of the stereo pair into two signals, one of which consists of a signal carrying information on the red component ($R_2$), a colour signal carrying limited information on the green colour whose value is selected so as to provide a stereoscopic picture of the objects of this colour and a colour signal carrying limited information on the magenta and red colour, the value of which is selected so as to provide correct reproduction of the saturation of these colours, while the second signal consists of a signal carrying information on the blue component ($B_2$), of the colour signal carrying limited information on the green colour and having a value selected so as to provide a stereoscopic picture of the objects of this colour, and a colour signal carrying limited information on the magenta and blue colour, the value of this signal being selected so as to provide correct reproduction of the saturation of these colours;

transmission of said signals of the first frame of the stereo pair and said signals of the second frame of the stereo pair, obtained due to matrixing, through individual communication channels;

reception of said signals of the first frame of the stereo pair and said signals of the second frame of the stereo pair;

reproduction of the green, red, and blue colours respectively;

production of a television picture by separating the green component for one eye of the viewer and by separating the red and blue components for the other eye of the viewer.

4. A method of stereoscopic colour television according to claim 3, including the steps of conversion, by means of matrixing, of said signals of the colour-separated images carrying information on the green, red and blue components ($G_1$, $R_1$, $B_1$) of the first frame of the stereo pair having a form:

$$G_1 + b_1 R_{k1} + c_1 B_{k1} + a_2 G_{k1} + M_1,$$

where $G_1$ is the signal carrying information on the green component and having an upper frequency range limit accepted for colour reproduction;

$G_{k1} = R_1 - G_1 \geq 0$ is the separate colour carrying limited information on the magenta and red colour and serving as a colour difference signal whose polarity is limited by the domain of positive values and whose frequency is limited by the same upper range as $G_1$;

$B_{k1} = B_1 - G_1 \geq 0$ is the separate colour signal carrying limited information on the magenta and blue colour and serving as a colour difference signal whose polarity is limited by the domain of positive values and whose frequency is limited by the same upper range as $G_1$;

$G_{k1} = G_1 - R_1 - B_1' \geq 0$ is the colour signal carrying limited information on the green colour and serving as a three-component colour difference signal whose polarity is limited by the domain of positive values and whose frequency is limited by the same upper range as $G_1$, where $-B_1' = R_1 - B_1 \geq 0$ is the colour-difference signal whose polarity is limited by the domain of negative values;

$M_1 = 0.6\,G + 0.3\,R_1 + 0.1\,B_1$ are high-frequency components of the primary signals of the first frame;

conversion, by means of matrixing, of said signals of the colour-separated images carrying information on the green, red and blue components ($G_2$, $R_2$, $B_2$) of the second frame of the stereo pair into two signals having a form:

$$R_2 + a_1 G_{k2} + b_2 R_{k2} \text{ and } B_2 + a_1 G_{k2} + c_2 B_{k2},$$

where $R_2$ is the signal carrying information on the red component;

$B_2$ is the signal carrying information on the blue component;

$G_{k2} = G_2 - B_2 - R_2' \geq 0$ the colour signal carrying limited information on the green colour and serving as a three-component colour-difference signal whose polarity is limited by the domain of positive values, where $-R_2' = =B_2 - R_2 \geq 0$ is the colour-difference signal whose polarity is limited by the domain of negative values;

$R_{k2} = R_2 - G_2 \geq 0$ is the colour signal carrying limited information on the magenta and red colour, said signal being a colour difference signal whose polarity is limited by the domain of positive values;

$B_{k2} = B_2 - G_2 \geq 0$ is the selective colour signal carrying limited information on the magenta and blue colour; in this case the coefficients $a_1$, $b_1$, $c_1$ are selected so as to provide stereoscopicity and eliminate colour distortions with green, magenta, red and blue saturated colours, while the coefficients $a_2$, $b_2$, $c_2$ are selected so as to compensate the drop in the saturation of the green, magenta, red and blue colour tones.

* * * * *